United States Patent
Serfling et al.

(10) Patent No.: US 6,239,904 B1
(45) Date of Patent: May 29, 2001

(54) FORENSIC MICROSCOPE, IN PARTICULAR FOR EXAMINATION OF WRITING

(75) Inventors: Thomas Serfling, Jena; Volker Heerich, Kleines Feld 8, D-37130 Gleichen, both of (DE)

(73) Assignees: Carl Zeiss Jena GmbH, Jena; Volker Heerich, Gleichen, both of (DE)

(*) Notice: Subject to any disclaimer, the term of this patent is extended or adjusted under 35 U.S.C. 154(b) by 0 days.

(21) Appl. No.: 09/329,835

(22) Filed: Jun. 10, 1999

(30) Foreign Application Priority Data

Jun. 11, 1998 (DE) .............................. 198 25 947

(51) Int. Cl.⁷ ..................... G02B 21/16; G02B 21/22
(52) U.S. Cl. ..................... 359/350; 359/361; 359/369; 359/377; 359/389
(58) Field of Search ........................... 359/377, 376, 359/369, 368, 389, 350, 351, 355, 356, 357, 361

(56) References Cited

U.S. PATENT DOCUMENTS 3,860,813 * 1/1975 Herzog et al. ..................... 359/360

5,835,264 * 11/1998 Tandler et al. ..................... 359/377

FOREIGN PATENT DOCUMENTS

| 195 07 344 A1 | 10/1996 | (DE) . |
| 195 18 006 A1 | 11/1996 | (DE) . |
| 197 22 726 A1 | 1/1998 | (DE) . |
| 816893 A2 * | 1/1998 | (EP) ..................... 359/377 |

* cited by examiner

Primary Examiner—Jon Henry
(74) Attorney, Agent, or Firm—Reed Smith LLP

(57) ABSTRACT

A forensic microscope, particularly for examination of writing, comprising a single-channel microscope with stereo viewing by synchronized interchange of the illumination angle in front of the microscope objective and/or of the angle of observation following the microscope objective and, further, by fluorescence excitation in a range of approximately 340 to 360 nm and/or between 400 nm and approximately 590 nm.

1 Claim, 1 Drawing Sheet

FORENSIC MICROSCOPE, IN PARTICULAR FOR EXAMINATION OF WRITING

BACKGROUND OF THE INVENTION a) Field of the Invention

The invention relates to a forensic microscope, particularly for the examination of writing.

b) Description of the Problems which the Invention Address

A frequent and important question in the forensic sciences is that of the time of origin of a relevant clue. Unfortunately, the methods of dating for forensics, many of which are known from archeology and anthropology, are either insufficiently accurate or are not applicable in general in view of the available stock of clues. Currently, in many laboratories around the world intensive research is under way to develop absolute dating methods. Unfortunately, noteworthy successes are seen only in some areas.

A particular set of problems is posed by assigning a time to documents of all kinds. The time of origin of a document is very often in dispute. Since the area of disputed documents often involves enormous sums, a method for determining the time of origin is especially important. However, there still exists no scientifically acceptable method in this area allowing an absolute dating of written matter. Therefore, the only remaining possibility of achieving results is through indirect methods.

The earliest possible time of origin of a document can be determined by examination of paper, the writing media employed, or printing methods in conjunction with a gathering of references or data. For example, a document produced by a laser printer cannot have originated in the year 1954. However, questioned time periods must often be narrowed down much further, so that the type of dating mentioned above is inadequate. A very common question in such cases is: "What came first?" Either it is presumed that a document has been tampered with or it is claimed that a blank signed sheet of paper has been used in an illegitimate manner. In the event that there is an overlapping or intersecting of writing media, there is a chance that the chronological sequence can be determined.

The Problem of Intersecting Strokes

At first glance, it does not appear particularly difficult to analyze an intersection of writing media. However, when the set of problems is examined more closely, a large number of sometimes insolvable difficulties emerge. A good overview of these problems is contained in G. Poulin, "Establishing the Sequence of Strokes: The State of the Art," *International Journal of Forensic Document Examiners,* Vol. 2, No. 1, January/March 1996, pp. 16–32, and in Tschopp/Pfefferli, "Die Anwendung des Rasterelektonenmikroskopes in der Urkundenuntersuchung [Application of the Scanning Electron Microscope in Examination of Documents]," *Kriminalistik* 2/98, pp. 137–140.

An especially serious problem in many of the methods described is either their limited effectiveness in delivering meaningful results or an unacceptable level of destruction. Once a document has been examined by means of a destructive method, it is normally no longer usable for further examination. In cases where the examination yields no findings, an indispensable piece of evidence may have been lost forever.

There are two basic points of attack:

1. The microtopography of intersecting writing often supplies information about the chronology or sequence of origin.

2. Chemical, mechanical or optical differentiation of writing media offers further indications.

Previous Methods of Examination

Microtopography

The stereo microscope and scanning electron microscope were previously used in image-generating methods for investigation of topography.

The stereo microscope offers the great advantage that it can work in real time, three-dimensionally and in true colors, but is a suitable instrument only in very rare cases because of its low magnification.

The scanning electron microscope has the great advantage of delivering high magnifications and spatial information. Because of the frequent need for vacuum-deposition of specimens, e.g., with gold, this method is considered destructive. A further disadvantage is the elaborate handling and insufficient capability to give true colors.

Writing Media Differentiation

The differentiation of writing media in the examination of intersecting writing was formerly carried out by microscopy in the visible part of the spectrum in order to render visible differences in color in the writing media employed. Various "lift-off" techniques for (destructive) investigation of the sequence of origin were also successfully used.

Other available techniques: Various methods for differentiation of writing media are known. Probably the most exact method is microspectral photometry in which the light of a point on a sample is normally divided into its spectral components and a curve is then obtained for the spectral intensities (useful range between approximately 250 nm and 1000 nm) of a dye. This method has the disadvantage that a graphic presentation can only be achieved at considerable expense and is therefore without significant value for investigation of the complex structures of intersecting writing. Another method is that of fluorescence excitation in the macroscopic area. In this case, fluorescence is excited in the infrared range by different wavelengths in the visible range or fluorescence is excited in the visible range with ultraviolet light. A video camera transmits the images recorded in this way to a display monitor. However, the method is unsuitable for investigation of intersecting writing because it is not possible to display any differentiation in the detail of the microstructure of the overlap or intersection.

SUMMARY OF THE PRIOR ART

At the present time, there is no commercially available system or technique which can deal in a comprehensive manner with the stated problems relating to intersecting writing and which, in addition is consistently nondestructive in addition.

OBJECT OF THE INVENTION

The primary object of the invention is to provide a system which makes it possible to analyze the microtopography of intersecting writing in a nondestructive manner, in real time and in true colors. A need exists for such a system.

SUMMARY OF THE INVENTION

This object is achieved in accordance with the invention by a forensic microscope for examination of writing which comprises a single-channel microscope with stereo viewing by means of synchronized interchange of the illumination angle in front of the microscope objective and/or of the angle of observation following the microscope objective. The invention further includes means for fluorescence excitation in a range of approximately 360 nm+/−40 nm and/or between 400 nm and approximately 590 nm.

Figure 1:
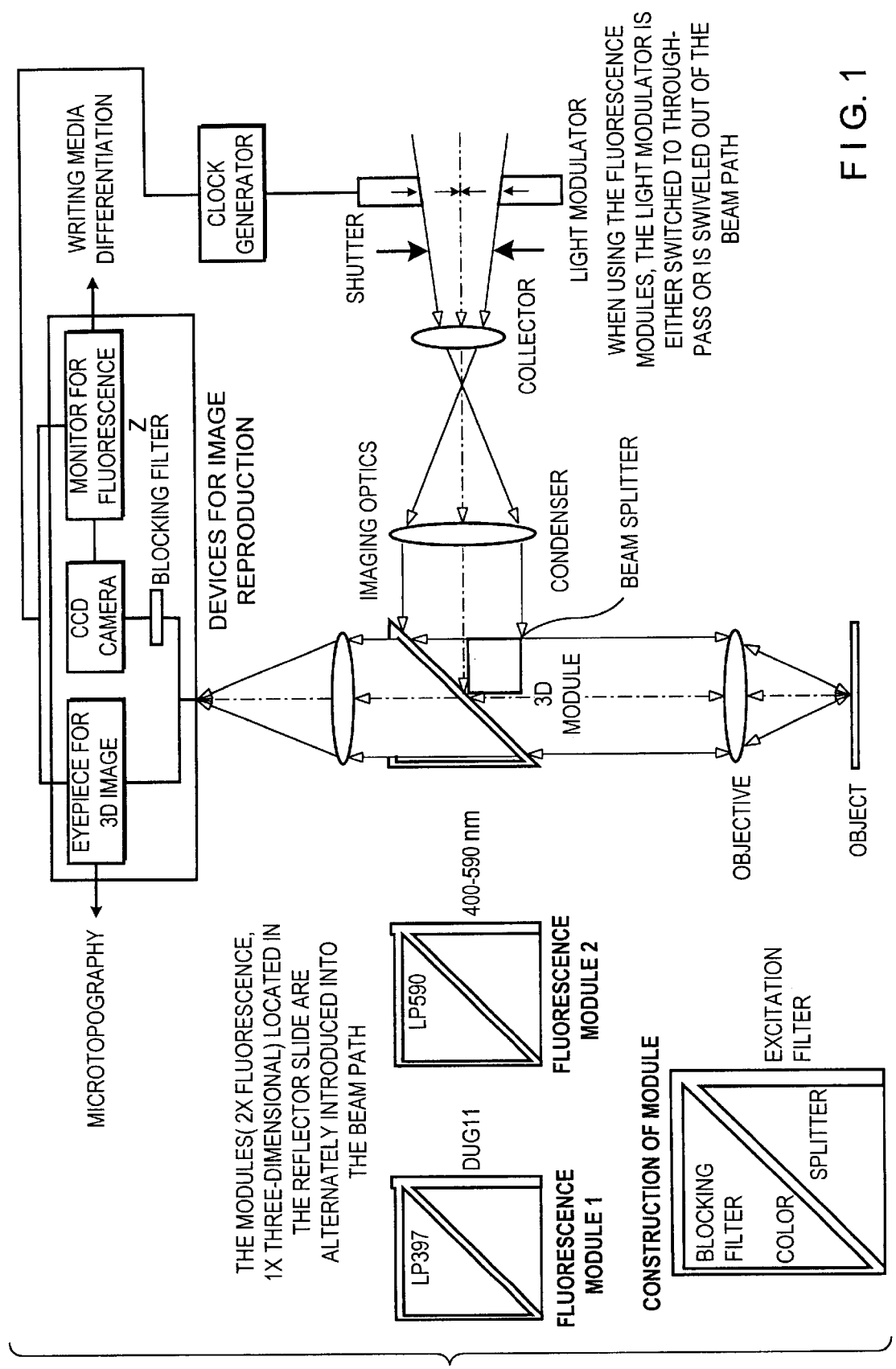
FIG. 1 illustrates in schematic and pictorial form a forensic microscope in accordance with the invention.

DESCRIPTION OF THE FORENSIC THREE-DIMENSIONAL MICROSCOPE AND ITS PREFERRED EMBODIMENTS

The forensic three-dimensional microscope is a fascinating new device and associated method for comprehensive analysis of intersecting writing. Apart from its general microscope functions, the forensic three-dimensional microscope is distinguished by two special features:

Investigation of Microtopography

The Three-dimensional Microscope Image

A difficult problem in the field of forensic document examination is the detection of the chronological sequence of intersecting strokes in identical and different writing media and the reliable and comprehensible documentation thereof. In conventional light microscopy, optical light microscopes were used in addition to the stereo microscope. Although the light microscope delivered high-resolution, high-magnification microscopic images, the topography of the objects remained hidden. The stereo microscope was capable of showing the topography, but only at low magnifications and with limited resolution. The three-dimensional microscope combines the advantages of both. The microscopic image is high-resolution and three-dimensional with true color and in real time.

For this purpose, a light modulator is introduced near the aperture stop plane of the illumination beam path (EP 730181 A2). This illumination shutter shifts the centroid of the illumination beam bundle into two different positions in a timed manner in such a way that the object is now illuminated at a determined angle, but with the maximum possible aperture. The timing of the device for image reproduction and the timing of the illumination shutter run synchronously. The repetition rate of 100 Hz makes it possible to perceive the image without flickering. Another construction for stereoscopic viewing is described in DE 19722726. In this case, a pupil split is carried out following the microscope. This generally offers advantages in conventional bright-field microscopy in that more is seen and more information is obtained from the object. In addition to the perceptible and therefore resolvable topography of the object, the microscope image also offers a two-fold to three-fold improvement in the depth of focus and up to 15% improved resolution.

Accordingly, the three-dimensional microscope makes it possible to detect and analyze the microtopography of intersecting writing nondestructively with true color and in real time.

Writing Media Differentiation

Multispectral Fluorescence in Microscope

Many writing media which appear identical to the human eye can be distinguished from one another by fluorescence excitation and selective filtration of fluorescence. However, experiments of this kind have not yet been carried out with microscopes. In particular, writing media differentiation for the investigation of intersecting writing has not yet been carried out.

Excitation

Two bandpasses are particularly suitable for the resolution of basal fluorescences. In the ultraviolet range, excitation in the range of approximately 340 to 360 nm is particularly suitable because of the low requirements for optical glass. Insofar as a pure UV excitation without longer-wave components can be ensured, fluorescences in writing media can be resolved up to the ultraviolet range.

The second essential excitation bandpass is quite wide at 400 nm to 590 nm. However, there are sharp cut-on and cut-off edges with very good blocking outside of the band. This ensures that fluorescence can be observed already just above the greatest excitation wavelength and that no unwanted excitations can occur in the UV range. By introducing additional filters, this excitation can be selectively limited.

Both excitation filters are arranged in a reflector slide together with the corresponding splitter mirrors. The coating of the splitter mirrors is optimized in such a way that a transmission of fluorescent light can be carried out up to a wavelength of 1000 nm.

Fluorescence

Writing media are distinguished in that a large number of different fluorescences are possible. Differentiation can often be carried out at the same excitation wavelength by different filters in the observation beam path. This rules out the arrangement of blocking filters in the reflector slide, which is quite common in the fluorescence microscope.

Further, a large number of fluorescences can only be found in the infrared range which is not visible to the human eye. For this reason, an image recording system, preferably a particularly sensitive CCD camera, is used. A filter changing system which contains optimized filters for respective applications is arranged in front of the image recording system.

Application in Real Cases of Intersecting Writing

Insofar as different writing media were used in intersecting writing to be examined, there is a good chance that the writing media—which at first glance might appear identical—can be optically separated from one another. It is then possible by means of selective excitation and fluorescence to show the courses of both writing media in the area of intersection separately from one another. In this case, when one of the strokes, for example, runs in a completely uninterrupted manner while another stroke has an hourglass-shaped narrowing in the area of intersection, it can be assumed that the latter is the second stroke. Another criterion for determining a sequence is the dragging away of portions of the writing ink material by the stroke carried out last. Such dragged away fluorescences can be found in many cases and can lead to unequivocal results. Further, by analyzing the brightness along the course of the two strokes to be examined by means of an image analysis system, dragging away of this type which is not apparent when viewing the image can be examined.

For explanation of the single-channel three-dimensional microscope, reference is had to EP 730181 A2, A3 by the present Applicant and further, with respect to the clocked splitting in the vicinity of the exit pupil, reference is had to DE 19722726 A1.

The microscope according to the invention comprises a light source, not shown, a collector, condenser and objective. The objective forms an image of the object in an observation plane via the imaging optics.

By means of the light modulator in the plane of the aperture stop, the centroid of the illumination beam bundle is displaced in a clocked manner in two positions in such a way that beam bundles are formed which illuminate the object at the angle required for stereo viewing with the highest possible aperture without unnecessarily limiting the observation aperture. The illumination beam path is reflected into the observation beam path via a beam splitter and illuminates the object via the objective.

The light coming from the object is imaged in the direction of observation and/or detection via the objective and imaging optics. For this purpose, a CCD camera and monitor are provided as shown in the drawing. A clock generator controls the light modulator and a video camera or observation optics such that one of the two images of a pair of stereoscopic images is recorded. The three-dimensional imaging is displayed, for example, by an electronic screen which is synchronized via the video camera for reproducing the two images as television fields. The screen is viewed through shutter spectacles. A transmitter (e.g., an LED) at the screen transmits light signals such that the latter are controlled by the clock generator and the light signals are received by a sensor at the shutter spectacles. The sensor controls the switching of the openings of the shutter spectacles so that each eye sees one image of the pair of stereoscopic images in the clock frequency of the light modulator, wherein the repetition rate makes it possible to view the image without flickering. Instead of shutter spectacles, the observer can also wear polarization spectacles when an electronic screen is used which has a switchable polarization filter triggered by the clock generator when the stereoscopic fields change.

In principle, three-dimensional viewing can be carried out without a video camera and monitor in that the observer is equipped with shutter spectacles but views through an eyepiece of a binocular tube. The clock generator must then synchronize the light modulator and shutter spectacles.

In practice, eyepieces for three-dimensional images are for observing the three-dimensional image, wherein a whole-surface shutter in each eyepiece is switched by the clock generator and releases its image to each eye alternately when the illumination is carried out for the respective eye at the stereo angle.

Further, a separate screen can be arranged in front of each eye of the observer in a manner known per se, wherein the screens are synchronized with the light modulation by means of the clock generator.

In the FIGURE, the object is illuminated via a beam splitter, wherein the beam bundle arrives at the object at the angle required for stereoscopic viewing.

A first surface transmits light in one clock and a second surface transmits light in the following clock through the illumination bundle. The centroids of the respective bundles are adjustable within the illumination aperture in such a way that the object is illuminated at the angle required for stereo viewing. Due to the lunes which are made possible in this way and which proceed out via half-shutters, the illumination aperture is utilized in the optimum manner and the observation aperture remains unrestricted, so that a high microscopic resolution is achieved.

In a construction, not shown, according to DE 19722726 A1, a lamp illuminates the object via a collector and condenser. The object modulates the light or is excited for self-illumination (e.g., fluorescence). The condenser and objective image the entrance pupil in the exit pupil. A field lens generates, via mirrors, an imaging of the exit pupil in the plane of a light modulator which is formed, e.g., as an LCD modulator. The mirrors can advantageously be displaced in a coupled manner for exact imaging of the exit pupils of different objectives in the modulator plane. Tube lenses provide for the imaging of the intermediate images of the object O in a video camera or, via beam splitters, in a binocular tube for eyepiece observation.

The light modulator divides the beam bundle in a clocked manner so that the centroid of the beam bundle makes possible stereo viewing and the aperture is utilized to the maximum degree.

In this connection, splits of the exit pupils are possible which proceed out via simple fields, for example, overlapping lunes. A video camera takes over the respective image in a clocked manner. The light modulator and the video camera are controlled by a control unit in such a way that one of the two images of a pair of stereoscopic images is recorded. The three-dimensional imaging is displayed, for example, by an electronic screen. The observer wears polarization spectacles and views a monitor via a monitor shutter which is a switchable polarization filter that is triggered by the control unit when the stereoscopic fields change.

The beam splitter shown in the FIGURE is advantageously exchangeable, for example, as a reflector slide, and fluorescence modules comprising a color splitter, an excitation filter for illumination and a blocking filter for observation/detection are swiveled in.

An HBO lamp can be used instead of a halogen lamp as a light source and the light modulator is either switched to through-pass or is swiveled out of the beam path.

In the construction according to DE 19722726 A1, stereo viewing is advantageously carried out simultaneously with fluorescence excitation. The observation eyepiece for stereo viewing can be exchangeable with the CCD camera for detecting fluorescence, or an additional beam splitter is provided for simultaneous eyepiece observation and camera recording, or stereo viewing is also carried out via the camera and the monitor.

The color splitters shown in the FIGURE include, on the one hand, an excitation filter DUG 11 of a wavelength 340 nm and a longpass filter LP 590 in the direction of observation of a wavelength above 590 nm with a color splitter FT 580 and, on the other hand, an excitation filter 400–590 nm, a color splitter FT 395 and a longpass filter LP 397 in the direction of observation above 397 nm. The exact specifications of the filters are as follows:

DUG 11: center wavelength 340 nm, half-width approximately 70 nm

FT 595: at 395 nm 50% transmission, >90% transmission approximately 410–1000 nm, reflection >90% at wavelengths <380 nm LP 397: at 397 nm 50% transmission, >90% transmission at approximately 415–1000 nm FT 580: at 580 nm 50% transmission, >90% transmission at 600–1000 nm, reflection >90% at wavelengths <550 nm LP 590: at 590 nm 50% transmission, >90% transmission at approximately 600–1000 nm.

In addition, blocking filters which allow the examination of determined wavelength ranges are arranged in front of the observation/detection part for fluorescence observation and/or detection.

As described above, the forensic three-dimensional microscope provides the most comprehensive arsenal of methods available in one device at this time for examination of all types of intersecting writing.

Intersections of identical or different writing media can be examined, and in many cases appraised, through examination of the microtopography.

The topography can be determined objectively and independent from influences on the part of the user by means of an image analysis system arranged subsequently.

The additional multiplicity of methods of multispectral fluorescence analysis provides additional possible indications and can make a decisive contribution to clarification in critical cases.

While the foregoing description and drawings represent the preferred embodiments of the present invention, it will be obvious to those skilled in the art that various changes and modifications may be made therein without departing from the true spirit and scope of the present invention.

What is claimed is:

1. A forensic microscope, for examination of writing, comprising:

a single-channel microscope with stereo viewing by clocked mutual change of illumination angle in front of at least one of a microscope objective and an angle of observation following said microscope objective, by fluorescence excitation in a range of approximately 340 nm to 360 nm and between 400 nm and approximately 590 nm;

beam splitters being provided for combining illumination and observation;

means being provided for exchanging beam splitters for combining illumination and observation;

a first exchangeable beam splitter being provided for stereoscopic viewing;

a second beam splitter being provided on an exchangeable reflector slide for fluorescence excitation in the range of 340–360 nm and;

a third beam splitter provided on the exchangeable reflector slide for fluorescence excitation in the range of 400–590 nm.

* * * * *